United States Patent [19]

Stape et al.

[11] Patent Number: 4,687,291

[45] Date of Patent: Aug. 18, 1987

[54] DUPLEX ELECTRO-FIBER CONNECTOR ASSEMBLY

[75] Inventors: William J. Stape, Lewisberry; Robert N. Weber, Hummelstown, both of Pa.

[73] Assignee: AMP Incorporated, Harrisburg, Pa.

[21] Appl. No.: 618,851

[22] Filed: Jun. 8, 1984

[51] Int. Cl.⁴ ............................................. G02B 6/38
[52] U.S. Cl. ............................... 350/96.21; 350/96.22
[58] Field of Search ............... 350/96.20, 96.21, 96.22

[56] References Cited

U.S. PATENT DOCUMENTS

| | | | |
|---|---|---|---|
| 3,923,371 | 12/1975 | Dalglersh | 350/96 C |
| 3,947,182 | 3/1976 | McCartney | 350/96 C |
| 3,982,815 | 9/1976 | Nakayama | 350/96.20 |
| 3,989,343 | 11/1976 | Lucuis et al. | 339/128 |
| 4,166,668 | 9/1979 | MacLeod | 350/96.20 |
| 4,258,977 | 3/1981 | Lukas et al. | 350/96.21 |
| 4,277,135 | 7/1981 | Schrott et al. | 350/96.21 |
| 4,319,802 | 3/1982 | Bowes | 350/96.20 |
| 4,339,172 | 7/1982 | Leather | 350/96.21 |
| 4,406,515 | 9/1983 | Roberts | 350/96.21 |
| 4,445,750 | 5/1984 | Grois et al. | 350/96.21 |
| 4,445,753 | 5/1984 | Collignon | 350/96.21 |
| 4,448,478 | 5/1984 | Matthews et al. | 350/96.21 |
| 4,449,784 | 5/1984 | Basov et al. | 350/96.21 |
| 4,483,584 | 11/1984 | Gresty | 350/96.21 |
| 4,526,438 | 7/1985 | Essert | 350/96.21 |
| 4,611,887 | 9/1986 | Glover et al. | 350/96.21 |

Primary Examiner—William L. Sikes
Assistant Examiner—Frank González

[57] ABSTRACT

A duplex electro-optic connector assembly enables mating the fibers of a first multifiber cable with like fibers of a second cable or cables with maximum axial alignment of the respective fiber pairs. An interconnect member receives cable terminating connectors in opposite sides thereof. Each connector carries the fibers of a respective cable in individual ferrules, each ferrule having limited floating mount within the respective connector. The mating pairs of ferrules are received in opposite ends of receptor membrs which have an axially profiled bore adapted to receive the respective ferrules and a profiled outer surface which allows movement about the geometric center of the receptor so as to axially align the bores of the ferrules received therein.

15 Claims, 11 Drawing Figures

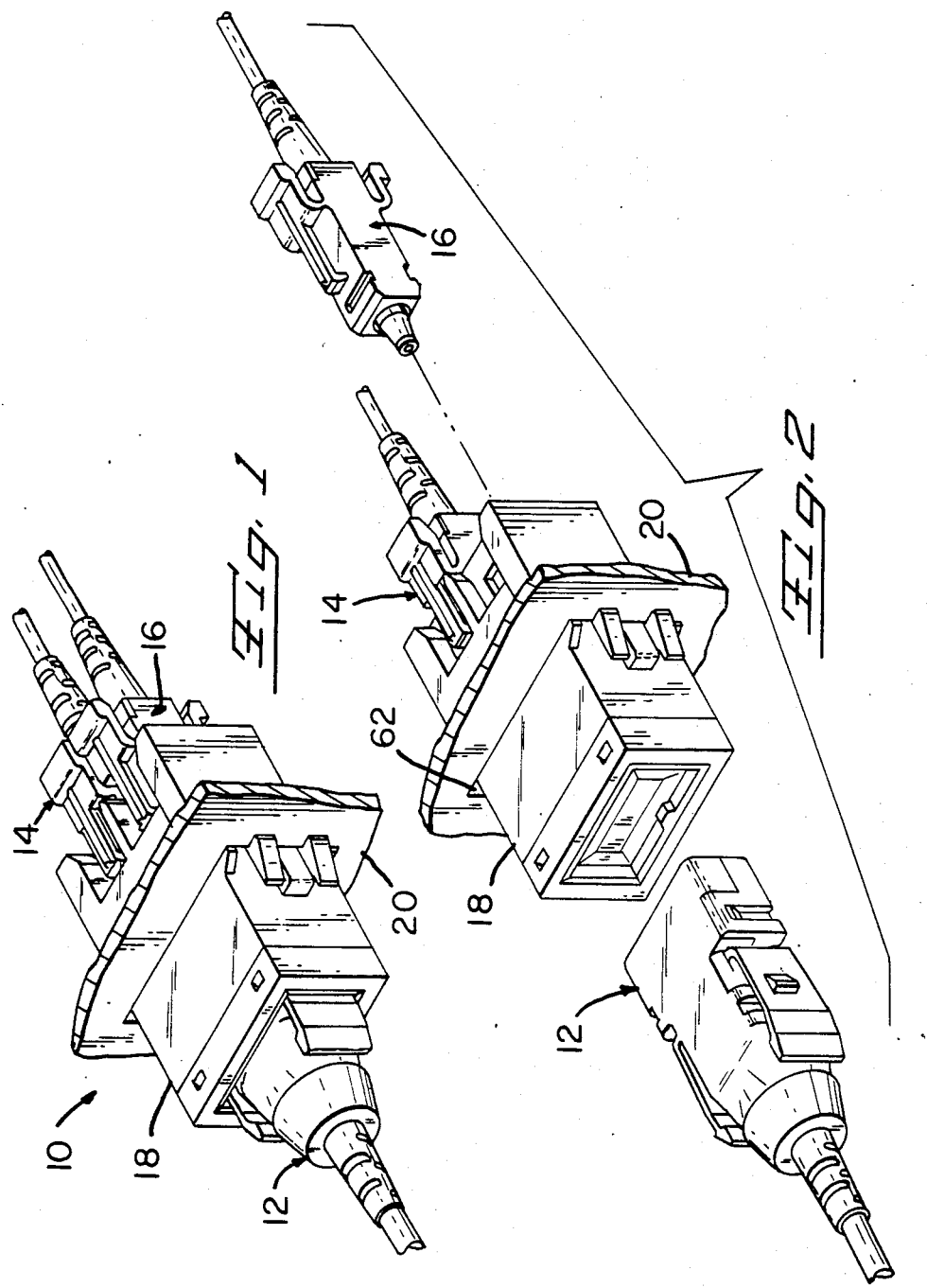

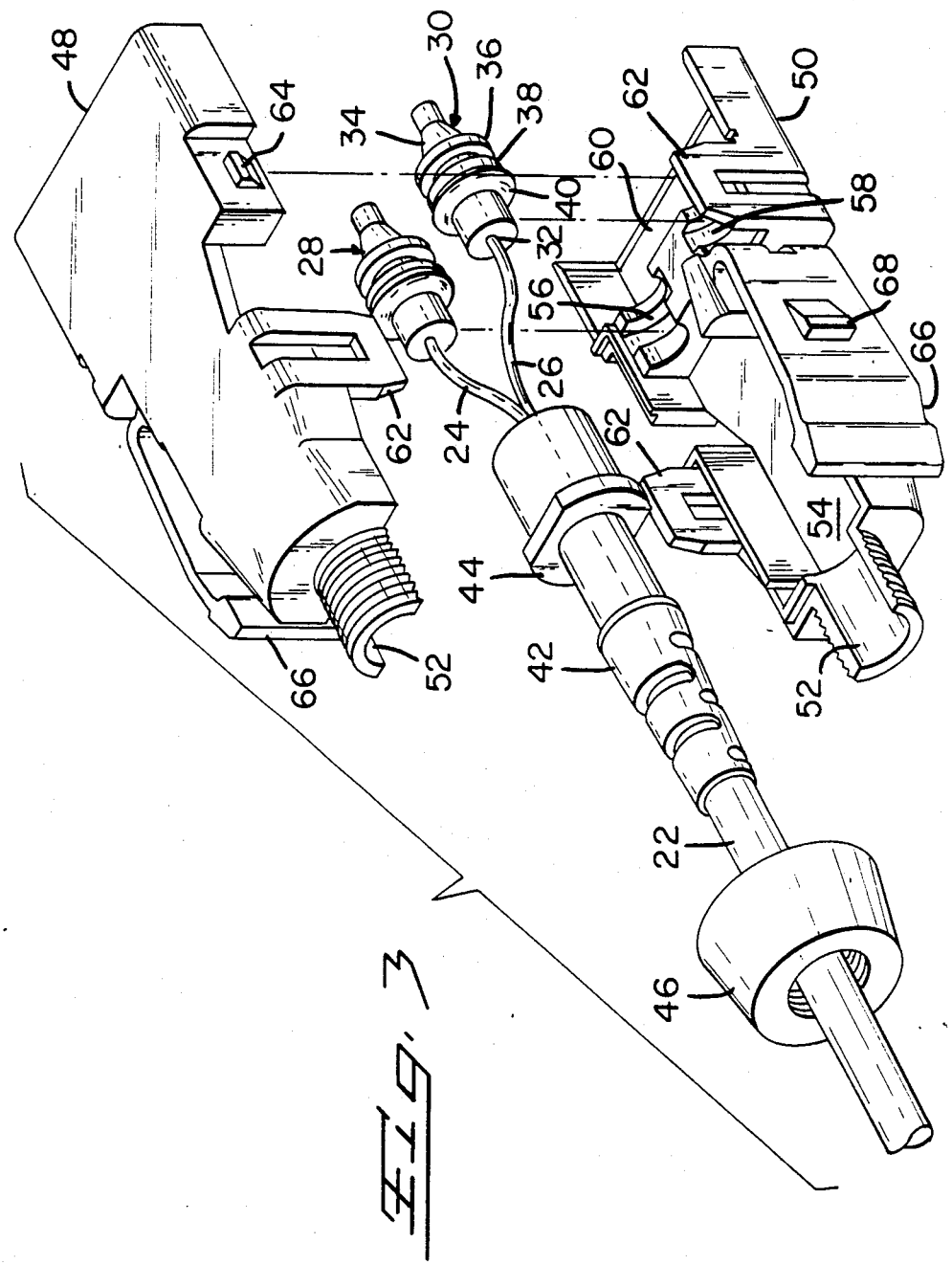

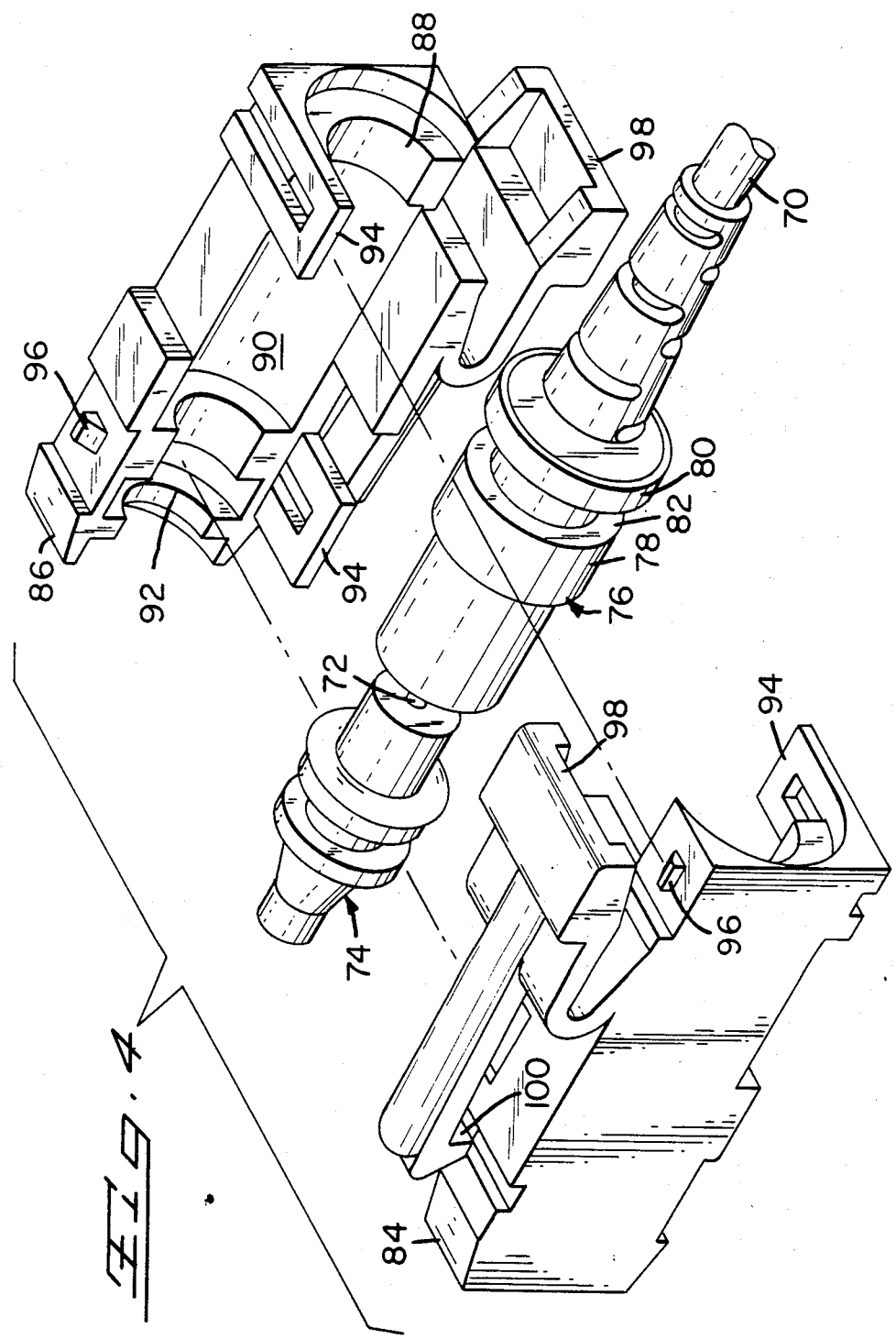

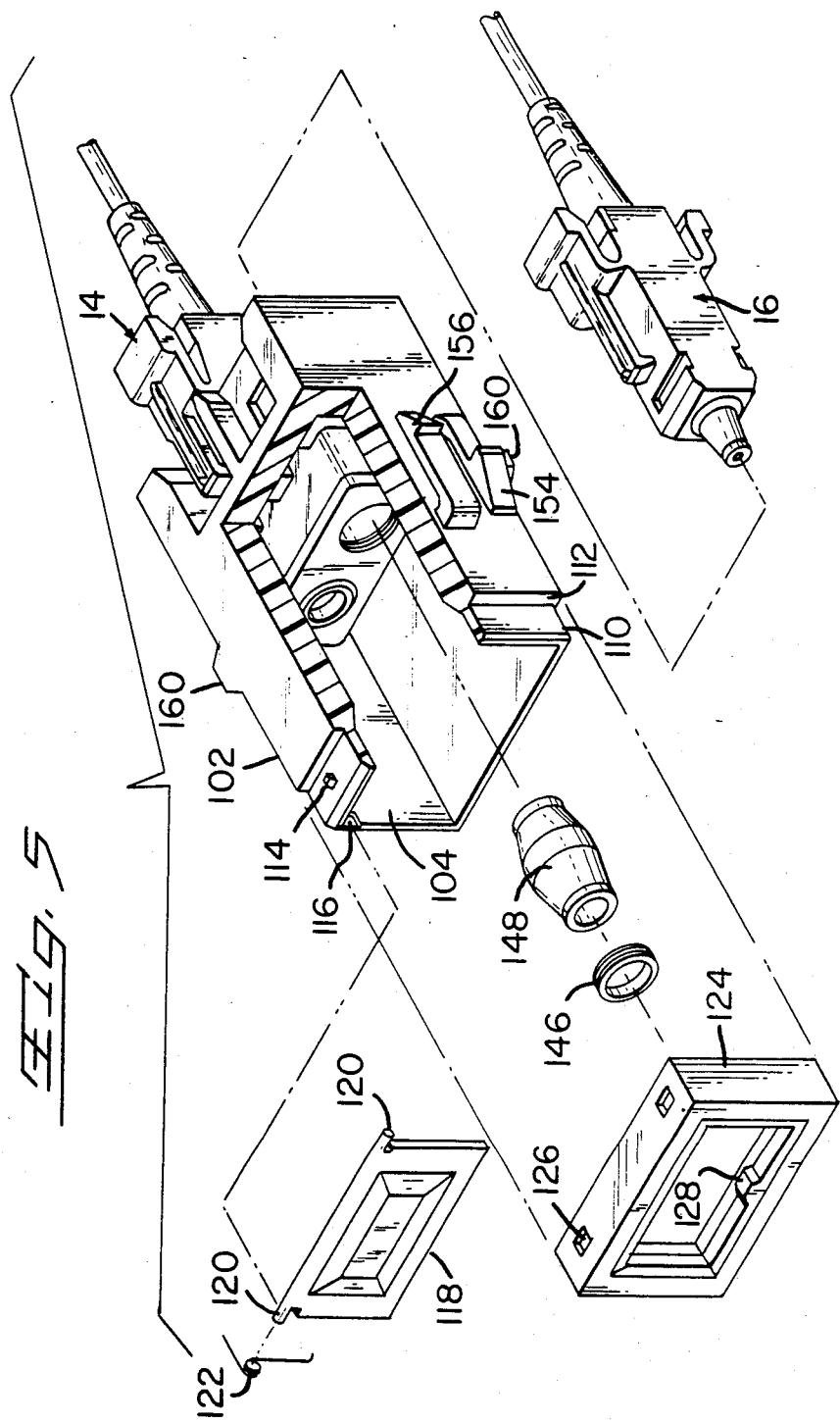

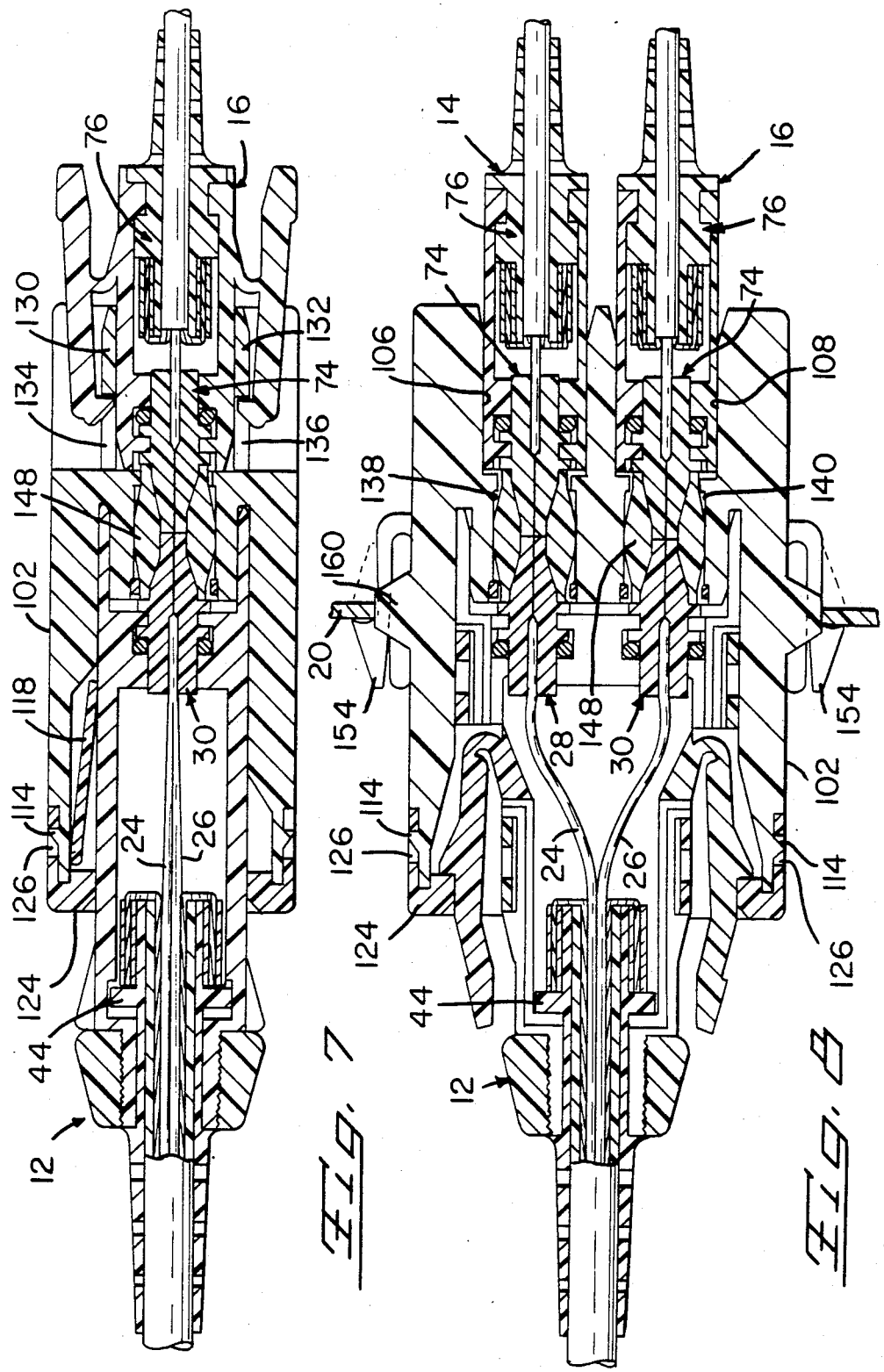

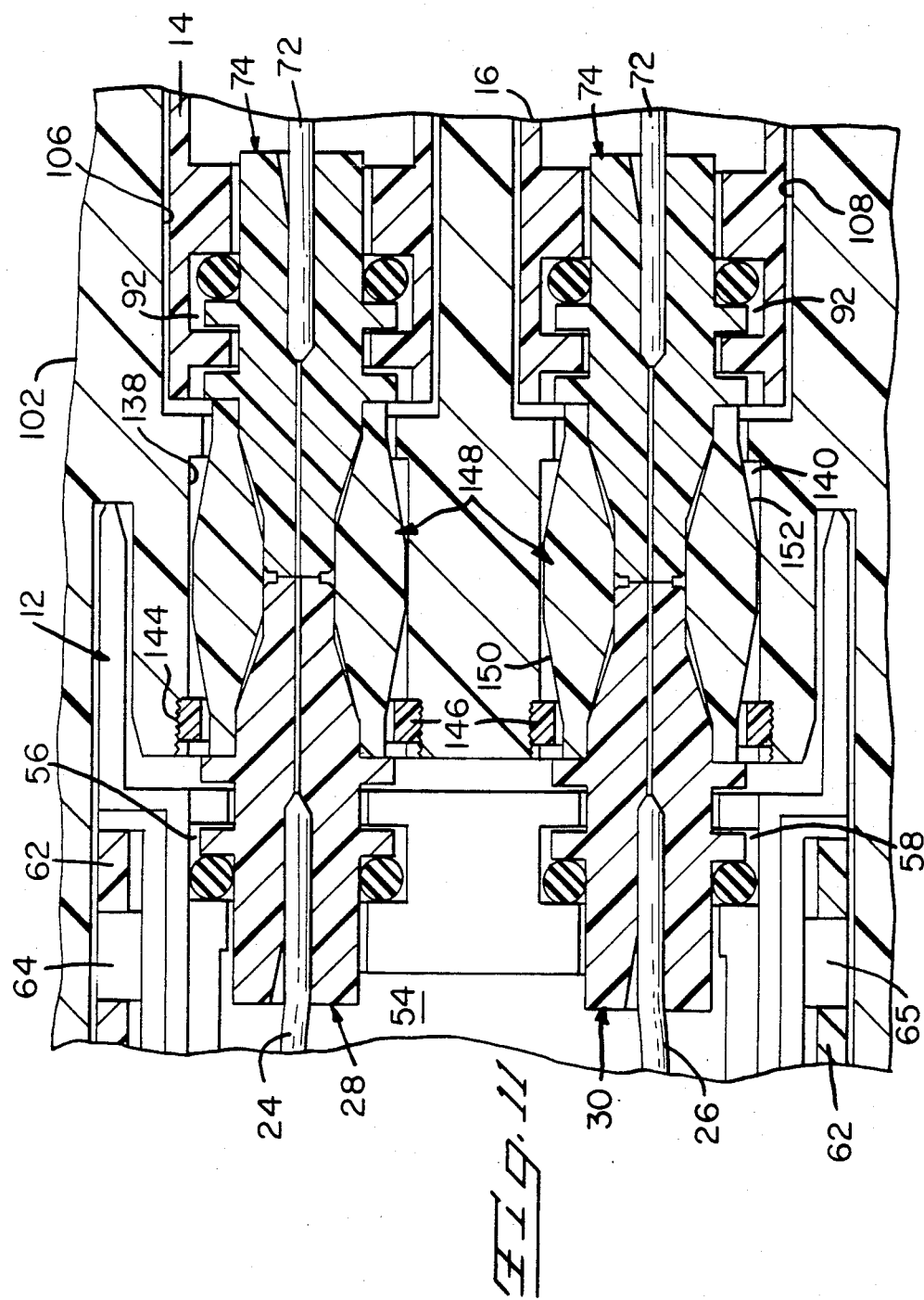

DUPLEX ELECTRO-FIBER CONNECTOR ASSEMBLY

FIELD OF THE INVENTION

The present invention relates to a duplex fiber optic connector and in particular to one in which there is provision for limited free float of mating ferrules to assure accurate fiber alignment.

BACKGROUND OF THE INVENTION

One of the primary difficulties in the field of fiber optics is to achieve for accurate alignment of optical fibers in order to obtain maximum light exchange. The difficulty arises in the fact that the parts are, for the most part, molded and, due to molding tolerances and material shrinkage, there is always the possibility for misalignment to occur even within a batch of like manufactured parts which purport to be identical. The difficulty increases significantly when attempts are made to align multiple fibers in a single connector, such as in a duplex connector.

The present invention overcomes the difficulties of the prior art by providing an interconnect device having first and second oppositely directed entry cavities in a housing, the cavities being connected by at least one passage. Each passage is profiled to have an inwardly directed flange on one end and a threaded nut receiving recess at the opposite end. A profiled receptor member is placed in each passage and secured therein by the flange and a nut in the threaded recess. The receptor has a profile exterior which allows it to pivot about its geometric center and has a profiled axial bore. The housing cavities are profiled to receive therein at least one fiber terminus, each terminus formed by a pair of mating hermaphroditic housing members which receive a cable in one end thereof and have a ferrule at the opposite end through which the fiber extends. Each terminus is also provided with means to latchingly engage with the interconnect device.

DESCRIPTION OF THE DRAWINGS

The present invention will be described by way of example with reference to the accompanying drawings in which:

FIG. 1 is a perspective view of a connector system accordng to the present invention in a fully assembled condition;

FIG. 2 is a perspective view, similar to FIG. 1, with two of the mating connectors exploded therefrom;

FIG. 3 is an exploded perspective view of a duplex connector according to the present invention;

FIG. 4 is an exploded perspective view of a single fiber connector according to the present invention;

FIG. 5 is a perspective view, partially exploded and partially in section, showing the details of the interconnect portion of the present invention;

FIG. 7 is a longitudinal section taken along line 7—7 of FIG. 1;

FIG. 8 is another longitudinal section taken along line 8—8 of FIG. 1;

FIG. 11 is an enlarged detailed section similar to FIG. 8.

DETAILED DESCRIPTION

Figure 6:
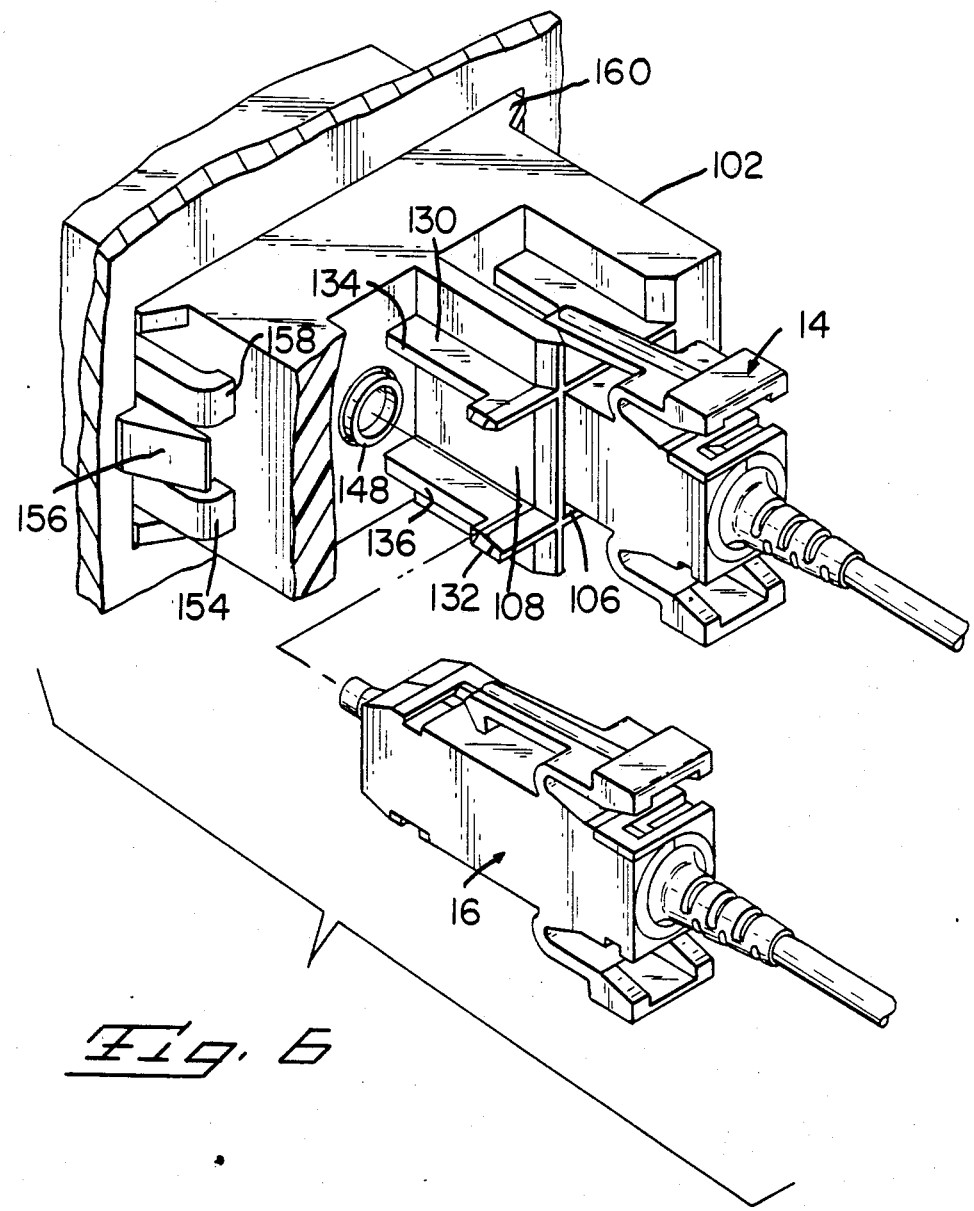
FIG. 6 is a perspective view, partially in section, taken from the opposite direction of FIGS. 1 and 5 with one single cable connector exploded therefrom.

The subject duplex electro-optic connector 10 comprises a duplex cable connector 12 and a pair of single cable connectors 14, 16 all mating with an interconnect member 18 mounted in a bulkhead 20.

Considering the duplex cable connector 12 first, and referring to FIG. 3, the cable 22 is of known construction and is provided with a pair of fibers 24, 26, each of which is terminated by a ferrule 28, 30. The ferrules 28, 30 are preferably formed of plastics material and each has a fiber receiving axial bore 32, a profiled nose 34, a pair of annular flanges 36, 38 and an O-ring 40. The cable 22 is provided with a strain relief 42 having a integral annular flange 44 and a nut 46. The duplex connector 12 also includes a pair of hermaphroditic covers 48, 50 which together define an externally threaded cable entry 52, a central cavity 54, a pair of profiled passages 56, 58 and a mating face 60. The covers are provided with interengaging latches 62 and lugs 64. The covers 48, 50 also include latching arms 66 which have outwardly directed latching lugs 68.

A single fiber connector 14 is shown in detail in FIG. 4 with a cable 70 having a single fiber 72 terminated by a ferrule 74 which is identical to the ferrules 28, 30 previously described. The cable 70 also is provided with a strain relief 76 having integral annular flanges 78, 80 defining a recess 82 therebetween. A housing is formed by a pair of mating hermaphroditic cover members 84, 86 which together define a profiled cable entry 88, a central cavity 90, profiled passage 92, and interengaging latches 94 and lugs 96. Each cover member also has a pivotal latching arm 98 with an inwardly directed latching shoulder 100.

Figure 9:
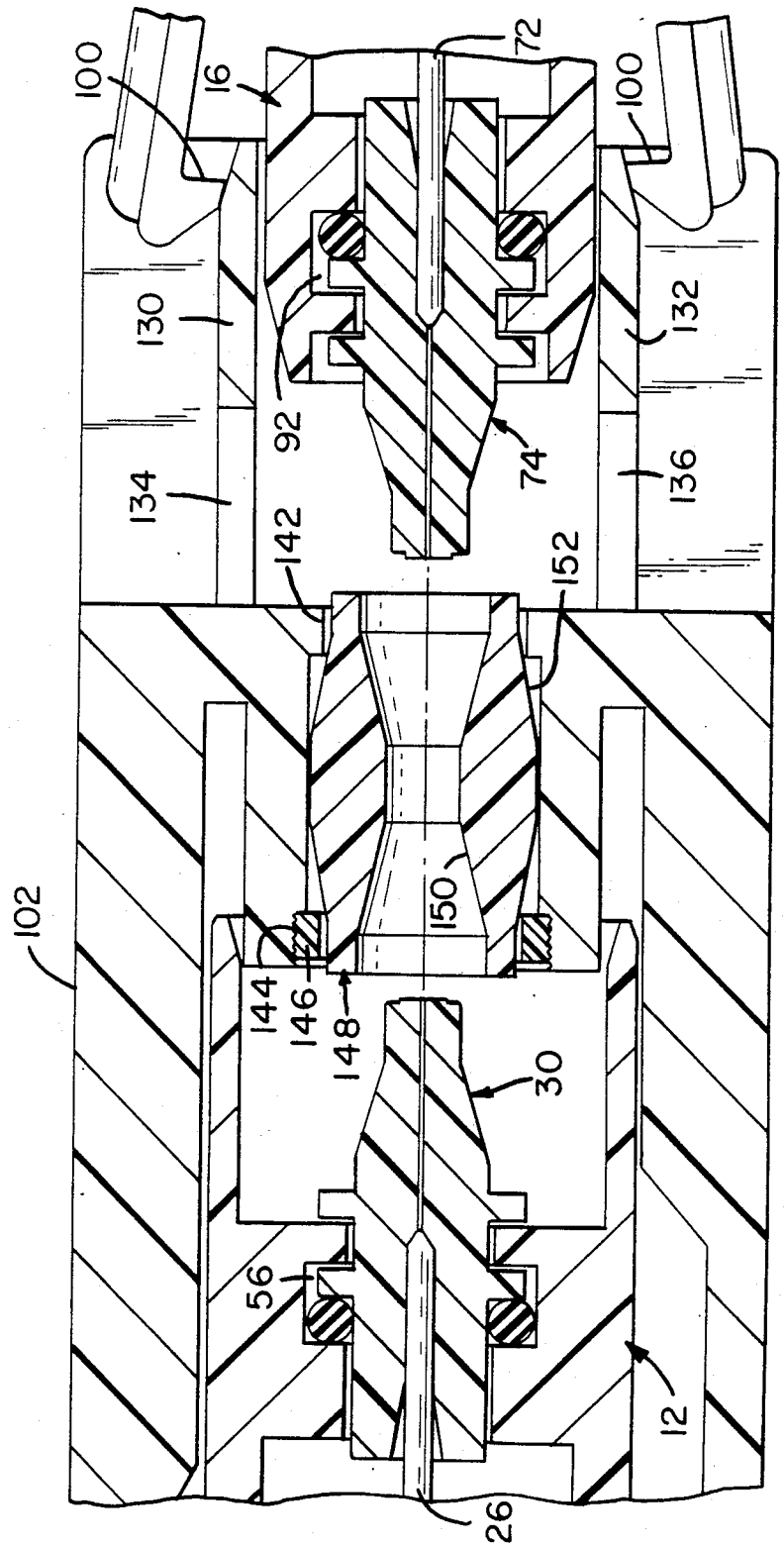
FIG. 9 is an enlarged section, similar to FIG. 7, showing the subject invention is an unmated condition.
Figure 10:
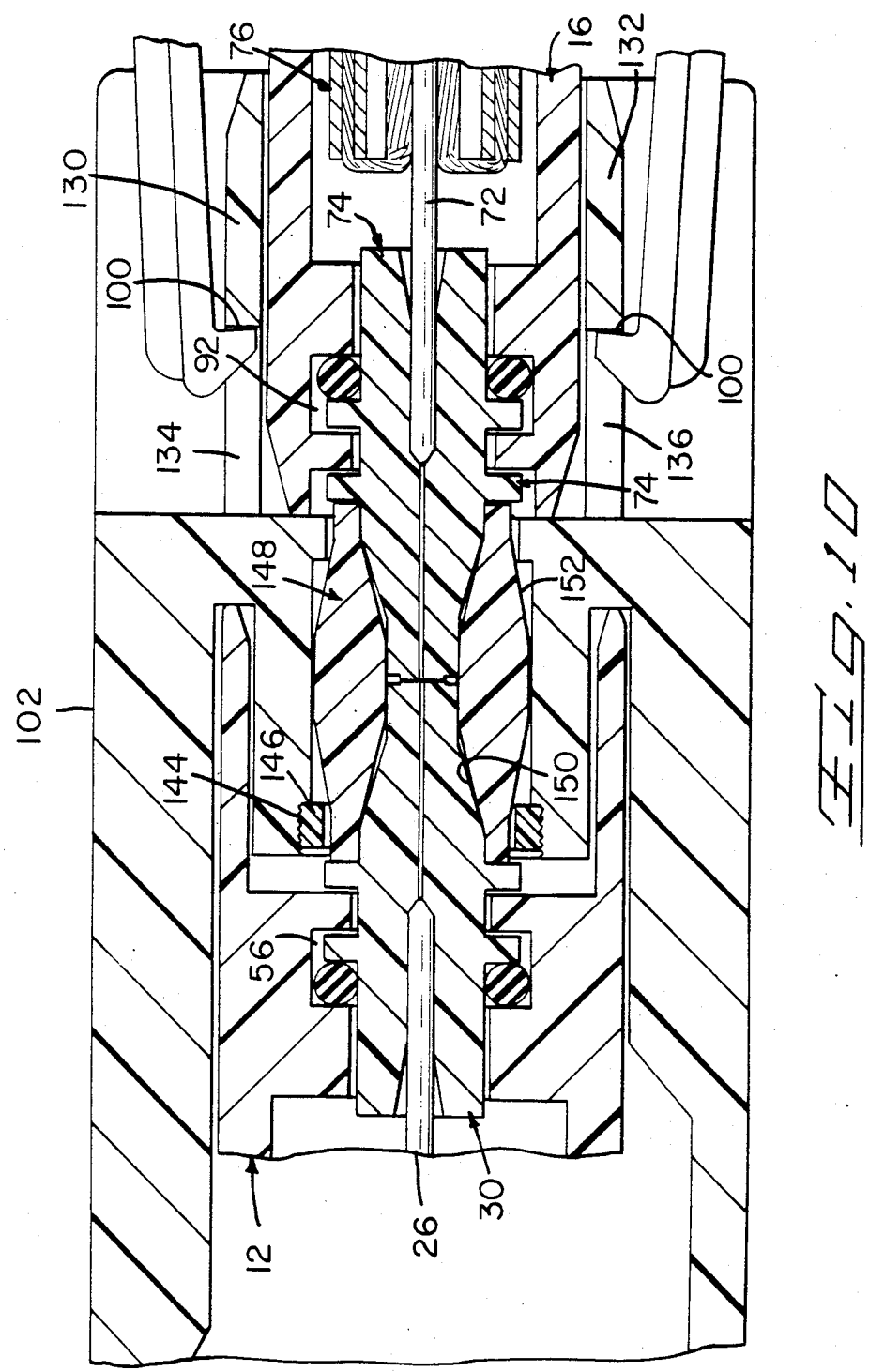
FIG. 10 is an enlarged section, similar to FIG. 9, showing the subject invention in a mated condition.

The interconnect member 18 can best be understood from FIGS. 5 to 8. The interconnect member 18 has a housing 102 defining a first cavity 104 and oppositely directed second and third cavities 106, 108. The first cavity 104 is profiled to receive the duplex connector 12 therein and has a stepped annular flange 110 at its open end defining an outwardly directed annular shoulder 112, outwardly directed integral lugs 114, and oppositely facing and spaced apart, inwardly directed recesses 116. A door 118 is mounted across the opening of the first cavity 104 with pivots 120 received in respective recesses 116. At least one spring 122 is mounted on one of the pivots 120 to bias the door to a closed position. An annular member 124 is mounted on the stepped flange 110 with lugs 114 engaging apertures 126 to secure it in place. The member 124 serves to retain and stop the door 118, as engagement for the latching lugs 68 of the duplex connector 12 and is provided with a polarizing and/or keying projecton 128. The second and third cavities 106, 108 are each profiled to receive a respective single fiber connector 14, 16 therein. Each cavity 106, 108 has spaced sidewalls 130, 132 having therein apertures 134, 136 aligned to receive the latching shoulders 100 of the latching arms 98 of the respective single fiber connectors 14, 16. The first cavity 104 is connected to the second and third cavities 106, 108 by passages 138, 140, respectively. Each passage 138, 140 (see FIGS. 9 to 11) is provided with an inwardly directed flange 142 on a first end and an internally threaded portion 144 on the opposite end which receives an exteriorly threded nut 146 therein. A receptor 148 is mounted in each passage 138, 140 and held therein by flange 142 and nut 144. The receptor 148 has a profiled axial bore 150 and a profiled exterior surface 152. The profiled bore 150 receives the fiber carrying ferrules 30, 74 in opposite ends thereof and the profiled exterior 152 allows the receptor 148 to pivot about its geometric center to accommodate for any misalignment of the ferrules 30, 74. The housing 102 is completed by a plurality of mounting arms 154, 156, 158 which are similar to the mounting arms shown in U.S. Pat. No. 3,989,343, the disclosure of which is incorporated herein by reference, and by alignment lugs 160.

The subject system is assembled by first terminating each fiber 24, 26, 72 with a respective ferrule 28, 30, 74. This is done in the well-known fashion of stripping the cladding from the fiber, inserting the fiber through the bore of the ferrule, securing it in place by adhesive means, cutting and polishing the end of the ferrule and fiber to get a smooth planar surface. The cables 22, 70 are then placed in their respective covers 48, 50 and 84, 86 with the ferrules 28, 30, 74 received in the profiles 56, 58, 92, the flanges 36, 38 generally positioning the ferrules and the O-rings 40 allowing for a resilient or somewhat floating mount when the covers are closed. The flange 44 engages the end of the cavity 54 and the flanges 78, 80 grip the profiled entry 88 to provide strain relief for the cables 22, 70. The covers are secured together by engaging the latches 62, 94 on their respective lugs 64, 96. Cable nut 46 is applied to the threaded entry 52. The interconnect member 18 is assembled by first inserting the receptors 148 into their respective passages 138, 140 and securing them in place by the nuts 146. The interconnect member 18 is then mounted in an aperture 162 of a panel or bulkhead 20. Due to the arrangement of the latching arms 154, 156, 158, the interconnect member 18 can be inserted from either side of the bulkhead, it is generaly centered by the lugs 160.

Mating of the connectors 12, 14, 16 is simply by applying the duplex connector 12 to open door 118 and be received in the cavity 104 and the single connectors 14, 16 are latched into the cavities 106, 108. The latching arms 66, 98 of the connectors engage with the housing 102 to secure the connectors in place.

It will be appreciated from FIGS. 7 through 11 that the receptor 148 is free to move and in combination with the limited float of the respective ferrules will cause the ferrules to assume an axially aligned condition.

The normal mounting of the interconnect member 18 is with the duplex portion to the outside of a cabinet or module. The door is provided on this end of the member 18 to keep ambient dust from entering the interface area and detract from the effectiveness of the coupling.

While the present invention has been shown mating a two fiber cable with two single fiber cables, it will be appreciated by those skilled in the art that any combination of single and/or multiple fiber cables can be joined without departing from the spirit or essential characteristics of the present invention.

What is claimed is:

1. In a fiber optic connector assembly, wherein optical fibers of optical cables are surrounded by corresponding ferrules, the corresponding ferrules are mounted to connectors, the connectors removeably connect to an interconnect member, and each pair of the corresponding ferrules is aligned by the connectors with a corresponding receptor, the improvement comprising:
   each said corresponding receptor is retained in the interconnect member,
   said each pair of the corresponding ferrules is inserted by a first of the connectors and a second of the connectors into open ends of the corresponding receptor,
   the interconnect member includes a pivotally mounted door, the door pivots on a portion of the interconnect member, said first of the connectors engages and pivots the door and removeably secures to the interconnect member, and
   said second of the connectors removeably secures to the interconnect member.

2. In a fiber optic connector assembly as recited in claim 1, the improvement further comprising;
   said first of the connectors and said second of the connectors include respective strain reliefs, and the optical cables are surrounded respectively by the respective strain reliefs.

3. In a fiber optic connector assembly as recited in claim 1, the improvement further comprising; said first of the connectors and said second of the connectors are secured to the corresponding ferrules prior to connection of said first of the connectors and said second of the connectors to the interconnect member.

4. In a fiber optic connector assembly as recited in claim 1, the improvement further comprising; each corresponding ferrule mounted to said first of the connectors includes a projecting flange and an O-ring adjacent the flange, the flange is positioned axially between the O-ring and the corresponding receptor, and the flange and the O-ring are surrounded by said first of the connectors.

5. In a fiber optic connector assembly as recited in claim 1, the improvement further comprising; said each pair of the corresponding ferrules is inserted by the first of the connectors and the second of the connectors into the open ends of the corresponding receptor.

6. In a fiber optic connector assembly as recited in claim 1, the improvement further comprising; the interconnect member includes a cavity receiving said first of the connectors, the door extends across the cavity, and the interconnect member includes an annular member at an open end of the cavity retaining the door and providing a stop for the door.

7. In a fiber optic connector assembly as recited in claim 1, the improvement further comprising; the interconnect member includes a panel mount.

8. In a fiber optic connector assembly as recited in claim 1, the improvement further comprising;
   each said corresponding receptor has open ends and aligns ends of the corresponding ferrules inserted into the open ends,
   each of said corresponding receptor is held pivotally by the interconnect member, and
   each said corresponding receptor has an exterior surface providing a pivot engaged against a portion of the interconnect member and pivotally mounting said each of said corresponding receptor with respect to the interconnect member.

9. In a fiber optic connector assembly as recited in claim 8, the improvement further comprising; the exterior surface providing the pivot is on an enlarged portion of said each of said corresponding receptor and is surrounded by the portion of the interconnect member.

10. In a fiber optic connector assembly as recited in claim 8, the improvement further comprising; the exterior surface providing the pivot is on a central portion of said each said corresponding receptor.

11. In a fiber optic connector assembly as recited in claim 8, the improvement further comprising; each said corresponding receptor is mounted in a corresponding passage of the interconnect member, and the pivot engages the corresponding passage.

12. In a fiber optic connector assemby, wherein optical fibers of optical cables are surrounded by corresponding ferrules, the corresponding ferrules are mounted to connectors, the connectors removeably connect to an interconnect member, and each pair of the corresponding ferrules is aligned by the connectors with a corresponding receptor, the improvement comprising;

each said corresponding receptor has open ends and aligns ends of the corresponding ferrules inserted into the open ends, each said corresponding receptor is held pivotally by the interconnect member, and each said corresponding receptor has an exterior surface providing a pivot engaged against a portionn of the interconnect member and pivotally mounting said each said corresponding receptor with respect to the interconnect member.

13. In a fiber optic connector assembly as recited in claim 12, the improvement further comprising: the exterior surface providing the pivot is on an enlarged portion of said each of said corresponding receptor and is surrounded by the portion of the interconnect member.

14. In a fiber optic connector assembly as recited in claim 12, the improvement further comprising; the exterior surface providing the pivot is on a central portion of said each said corresponding receptor.

15. In a fiber optic connector assembly as recited in claim 12, the improvement further comprising; each said corresponding receptor is mounted in a corresponding passage of the interconnect member, and the pivot engages the corresponding passage.

* * * * *

UNITED STATES PATENT OFFICE
CERTIFICATE OF CORRECTION

Patent No. 4,687,291　　　　　　　　　　Dated August 18, 1987

Inventor(s) William J. Stape and Robert N. Weber

It is certified that error appears in the above-identified patent and that said Letters Patent are hereby corrected as shown below:

IN THE CLAIMS:

Claim 12, column 6, line 5, change "portionn" to read ---portion---.

IN THE SPECIFICATION:

Change the title "Duplex Electro-Fiber Connector Assembly" to read ---Duplex Fiber Optic Connector Assembly---.

Signed and Sealed this

Twelfth Day of January, 1988

*Attest:*

DONALD J. QUIGG

*Attesting Officer*　　　*Commissioner of Patents and Trademarks*